J. C. GASKILL.
MINE CAR BEARING AND AXLE.
APPLICATION FILED DEC. 15, 1921.
1,408,878.
Patented Mar. 7, 1922.
2 SHEETS—SHEET 1.
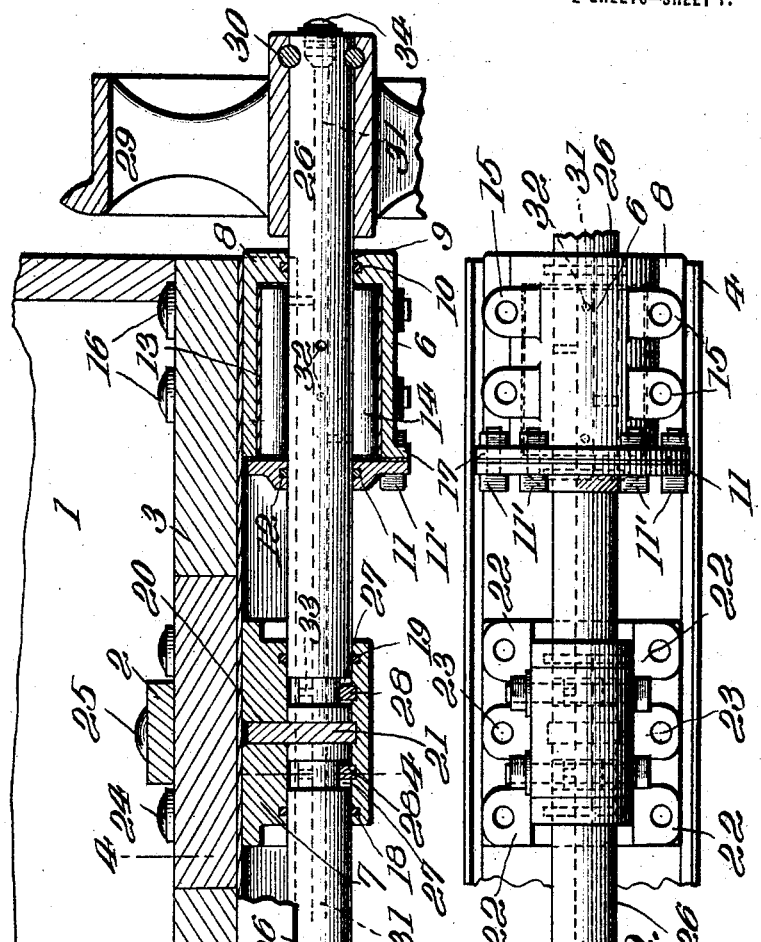
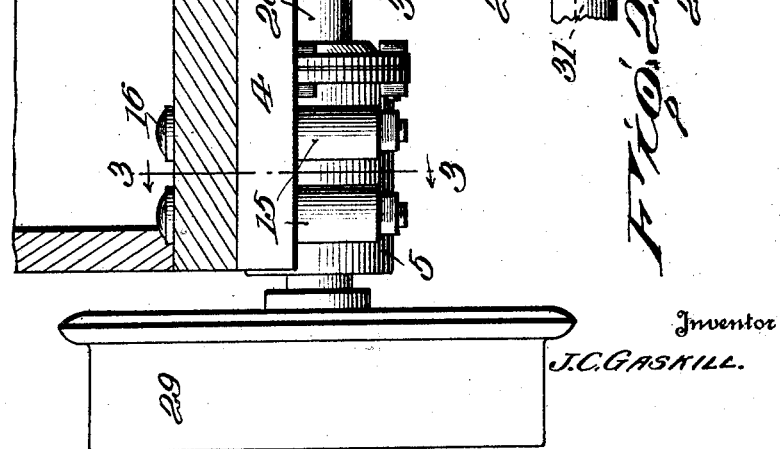
Inventor
J.C. GASKILL.
Attorney

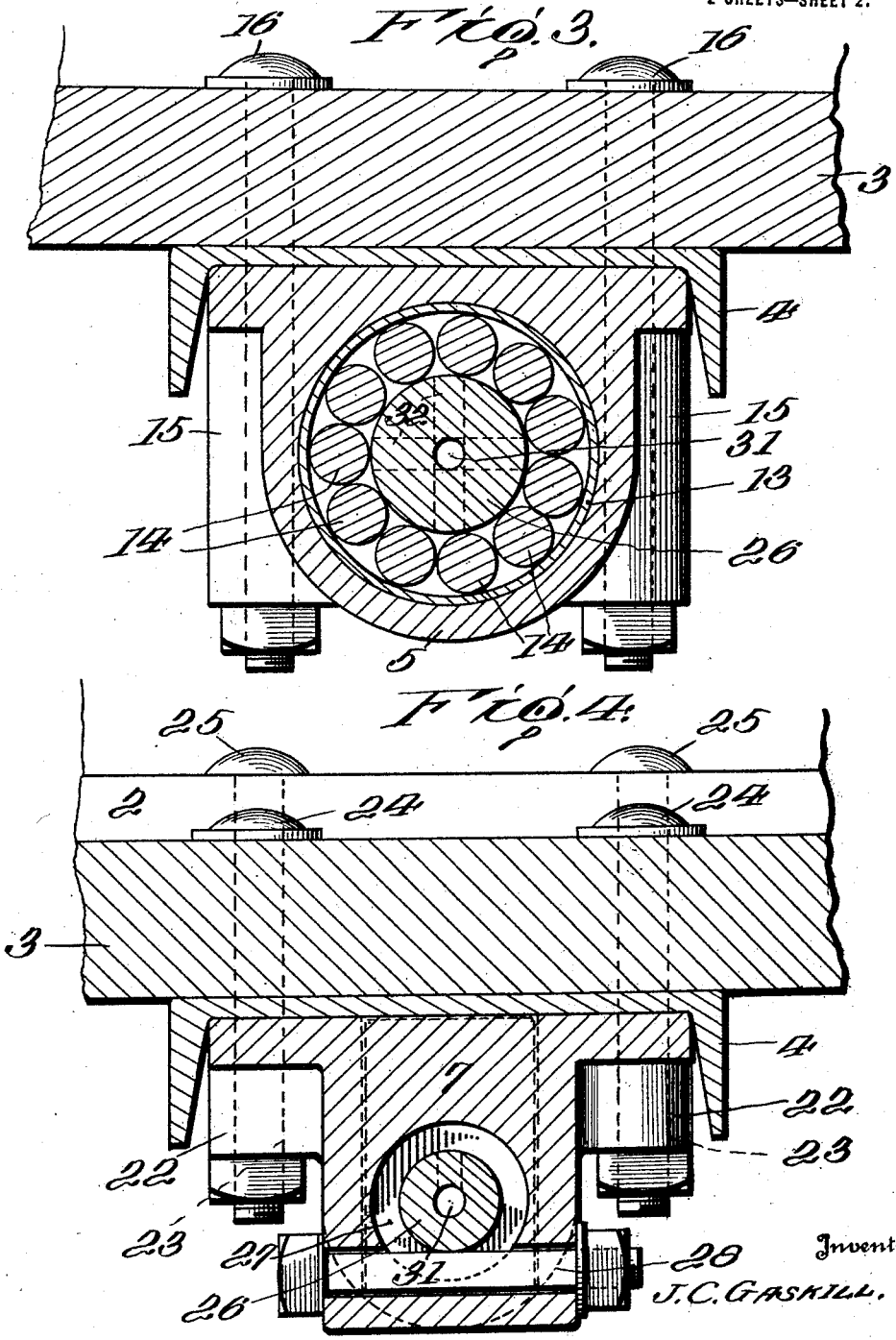

UNITED STATES PATENT OFFICE.

JAMES C. GASKILL, OF FAIRMONT, WEST VIRGINIA.

MINE-CAR BEARING AND AXLE.

1,408,878.   Specification of Letters Patent.   Patented Mar. 7, 1922.

Application filed December 15, 1921. Serial No. 522,566.

*To all whom it may concern:*

Be it known that I, JAMES C. GASKILL, a citizen of the United States, residing at Fairmont, in the county of Marion and State of West Virginia, have invented certain new and useful Improvements in Mine-Car Bearings and Axles, of which the following is a specification, reference being had therein to the accompanying drawing.

This invention relates to certain new and useful improvements in mine car bearings and axles, the object being to provide a truck for a mine car in which the bearings are mounted in a channel bar secured to the bottom of the car in such a manner that the bearings are held in their proper position and a construction of axle is provided whereby means is provided for taking up the end thrust by a central thrust bearing in order to relieve the end bearings of the strain.

Another and further object of the invention is to provide a mine car wheel bearing and axle in which the axle is formed of two sections, each section having a wheel rigidly secured thereto and provided with an outer bearing, the inner end of each axle being mounted in a central thrust bearing in which is mounted a hard steel disc which takes the end thrust from the end of the axle.

Another and further object of the invention is to provide novel means for lubricating the bearings through a passage formed in the axle which is provided with ducts for the lubricant so that lubricant can be fed to the bearings by applying a grease gun to the end of each axle, thereby enabling the bearings to be thoroughly lubricated in such a manner that they will be supplied with a lubricant at all times to reduce friction, the bearings being provided with packings to prevent the escape of the lubricant.

Another and further object of the invention is to provide a construction whereby the center of the wheel hub does not have to be at the gage line as by securing the wheel tight on the axle the end of the outer bearing box can be placed near the outer edge of the mine car, which will prevent the mine car axle from being bent.

A still further object of the invention is to provide a bearing and axle in which the loose collars between the hub of the mine car wheel and axle bearing are eliminated and a clearance is provided between the hub of the mine car wheel and bearing so as to prevent sand and dirt dropping out of the mine car and affecting the wearing of the bearing in any way.

Another object of the invention is to provide a construction which is exceedingly simple and cheap to manufacture, the bearings being secured in a channel bar by bolts extending transversely through the bottom of the mine car and draw bar so that the channel bar and bearings can be readily inserted or removed.

Other and further objects and advantages of the invention will be hereinafter set forth and the novel features thereof defined by the appended claims.

In the drawings,

Figure 1 is a longitudinal section through a portion of a mine car showing my improved construction of bearing and axle, partly in section;

Figure 2 is a detail inverted plan view of one of the outer bearings and the central thrust bearing, the bolts for securing the bearings in position being removed;

Figure 3 is an enlarged vertical section taken on line 3—3 of Figure 1; and

Figure 4 is an enlarged section taken on line 4—4 of Figure 1.

In the drawings 1 indicates a mine car of the ordinary construction which is provided with a central draw bar 2, said car being provided with the usual bottom 3 and while I have shown the particular construction of mine car, it is, of course, understood that my invention is capable of being used in connection with any of the various constructions of mine cars now in use and therefore, I do not wish to limit myself to the use of my bearing and axle to any particular construction of car.

My improved construction of truck bearing and axle for a mine car comprises a channel bar 4 forming what might be termed a truck which is adapted to be rigidly secured to the bottom of the car and extends transversely across the bottom of the car for the full width thereof as clearly shown in the drawing.

Mounted within the channel bar 4 at each end is a bearing 5 and 6 and a central thrust bearing 7, the outer bearings 5 and 6 being constructed identically alike and the description of one will be sufficient for both. Each of the outer bearings is provided with a closed outer end 8 having an opening 9 surrounded by an annular groove in which is arranged a packing 10. The inner end of each bearing is closed by a removable cap 11, provided with a central opening surrounded by an annular groove carrying a packing 12.

The chamber of the bearing is provided with a hard steel lining 13 and roller bearings 14 as clearly shown in Figures 1 and 3. The bearing is adapted to fit snugly within the channel and is provided with lugs 15 through which vertical bolts 16 are adapted to pass for securing the outer end of the channel bar to the bottom of the car and the bearings within the channel bar. The removable caps of the bearings are secured to a flange 17 by bolts 11'.

The central thrust bearing 7 has an opening extending transversely therethrough, the walls of the opening adjacent its outer end being provided with annular grooves in which packings 18 and 19 are arranged and the bearing is provided with a centrally disposed slot 20 in which a hard steel disc 21 is disposed for the purpose hereinafter fully described.

The thrust bearing is adapted to fit snugly within the channel bar 4 and is provided with lugs 22 and 23. Bolts 24 are adapted to pass through the channel bar and bottom of the car and the lugs 22 for securing the central thrust bearing in position. Extending through the lugs 23 are bolts 25 which extend through the channel bar, bottom of the car and draw bar 2 so as to rigidly secure the bearing against end movement and it will be noted that these bolts also secure the central portion of the bearing to the bottom of the car so that the bottom is rigidly attached.

Extending through each of the bearings is an axle 26 which extends into the central thrust bearing and is provided with an annular groove 27 adjacent its inner end adapted to receive square bolts 28 for locking the axle within the bearings, said bolts extending through passages formed in the bearing as clearly shown in Figure 2.

Rigidly secured on the outer end of each axle is a wheel 29 by bolts 30 as clearly shown in Figure 1, the hub of which is spaced slightly from the end of the outer bearing, which as herein shown projects slightly beyond the bottom of the mine car and is held in spaced relation by the steel disc 21 which is engaged by the inner end of the axle 26 and it will be noted that the inner ends of both axles engage with the disc 21 upon opposite sides.

Each of the axles 26 is provided with a longitudinal bore 31 forming a lubricating passage which is provided with ducts 32 radiating therefrom within the outer bearing and a duct 33 extending into the thrust bearing as clearly shown in Figures 1, 3 and 4.

The outer end of the passage is closed by a plug 34 provided with a spring valve for closing the same so constructed as to receive a grease gun, whereby the lubricant can be forced into the passage 31 and out through the ducts 32 and 33 in order to thoroughly lubricate the bearings 5, 6 and 7 and by filling the passage with lubricant, the bearings will be maintained lubricated a long time as the lubricant is held within the bearings by the packings.

It will be noted that the central thrust bearing is provided with a thrust disc of hard steel disposed centrally therein and held in position by the bearing when placed within the channel bar and after the bearing has been placed in position it is impossible to remove the disc without removing the bearing from the channel bar.

The bolts employed for holding the bearings in the channel bar also secure the channel bar to the car and as the channel bar extends transversely across the bottom of the car, the bearings are held in perfect alignment whereby friction is reduced and a construction is provided which will withstand all the strain to which the bearings are subjected.

By forming the axle in two sections and having the inner ends mounted in a central thrust bearing, I am able to attach the car wheels rigidly to the ends of the axle so as to allow the car to round a curve as each axle will travel independently of the other.

The construction of lubricating means provides means for maintaining oil within the bearings at all times so that the axles run in roller bearings thoroughly lubricated.

From the foregoing description it will be seen that I have provided a mine car bearing and axle in which a pair of roller bearings are disposed in a channel bar arranged under the bottom of the car, each roller bearing or plain bearing carrying an axle section, the inner end of which is mounted in a central thrust bearing disposed within the channel bar in such a manner that all of the bearings are held in perfect alignment and a construction is provided whereby the disadvantages now existing in bearings for mine cars are eliminated.

What I claim is:—

1. The combination with a car, of a channel bar carried thereby, outer bearings mounted in said channel bar, a central thrust bearing mounted in said channel bar and a sectional axle mounted in said outer bearings having its inner ends secured within said thrust bearing.

2. A mine car bearing and axle comprising a channel bar adapted to be secured to the bottom of a car, outer bearings arranged within the channel of said bar, axles mounted in said outer bearings having grooved inner ends arranged within said central bearing, bolts extending through said central bearing into the grooves of said axles for locking said axles in said bearing and a thrust disc arranged within said central bearing adapted to be engaged by the inner ends of said axles.

3. The combination with a car, of a channel bar adapted to be arranged transversely under the bottom of said car, outer bearings and a central thrust bearing arranged within the channel of said bar, bolts extending through said bearings, channel bar and bottom of said car for securing said bearings within said channel bar and said channel bar to said car and axle sections mounted in the outer bearings having their inner ends secured within the thrust bearing.

4. A mine car having bearing housings secured to the bottom of said car at each side thereof, said housings being provided with roller bearings, a central thrust bearing secured to the bottom of the car in transverse alignment with said outer bearings, said thrust bearing being provided with a removable thrust disc, axle sections mounted in said outer bearings having their inner ends extending into said central bearing and provided with annular grooves adjacent their inner ends, locking bolts extending through said thrust bearing into the grooves of said axles for locking said axles within said bearings and wheels fixed on the outer ends of said axles.

5. A mine car bearing and axle comprising outer bearing members provided with roller bearings, said bearing members being provided with removable caps, a central thrust bearing having a removable thrust disc, axles extending transversely through said outer bearings having their inner ends secured within said central bearing and adapted to engage the thrust disc thereof, wheels fixed to the outer ends of said axles, said axles being provided with longitudinal lubricating passages having radial ducts in communication with said bearings.

6. A mine car wheel and axle composed of a pair of outer bearings and a central thrust bearing, axle sections mounted in said outer bearings having their inner ends secured in said thrust bearing, said axle sections having lubricating passages in communication with said bearings, said bearings being provided with packing rings surrounding said axles at each end thereof and a central thrust bearing disposed within said central bearing adapted to be engaged by the ends of said axles.

7. The combination with a car, of a channel bar arranged transversely under said car, outer bearings arranged within the channel of said bar, a central bearing arranged within the channel of said car, said bearings being provided with apertured lugs, bolts passing through the lugs of said bearings, channel bar and bottom of said car for securing said bearings within said channel bar and said channel bar to said car and axles mounted in the outer bearings having wheels fixed on their outer ends, said axles being secured within the central bearing.

8. A mine car having an axle formed of two sections, each section being mounted in a roller bearing adjacent its outer end and having its inner end secured within the thrust bearing and a removable thrust disc arranged within said thrust bearing engaged by the inner ends of said axles.

9. A mine car having a channel bar extending transversely thereof carrying outer bearings and a central thrust bearing and a sectional axle mounted in said bearings having wheels fixed on its outer ends and means for securing the inner ends in said central bearing.

10. A mine car having an outer bearing at each side thereof and a central thrust bearing in transverse alignment therewith, said outer bearings being provided with closed outer ends having bores surrounded by packing rings and provided with removable covers at their inner ends having bores surrounded by a packing ring, roller bearings mounted in said outer bearings, a central thrust bearing provided with a transverse bore, the outer ends of said bore being surrounded by packing rings, axles carrying fixed wheels mounted in said bearings extending into the bores of said thrust bearing, the inner ends of said axles being provided with annular grooves, square locking bolts extending through said central bearing and grooves of said axles for locking said axles within said bearing and a central thrust disc adapted to be engaged by the ends of said axles.

11. A bearing and axle for mine cars composed of a channel bar having outer bearings and a central bearing arranged within the channel thereof, said outer bearings being provided with roller bearings and a central bearing with a thrust disc, axle sections mounted in said outer bearings having their inner ends secured within said central bearing, said axle sections having longitudinal lubricating passages closed at their outer ends by plugs, said lubricating passages being provided with radial ducts in communication with the bearings.

In testimony whereof I hereunto affix my signature.

JAMES C. GASKILL.